United States Patent [19]

Price

[11] Patent Number: 5,912,796
[45] Date of Patent: Jun. 15, 1999

[54] METALLIZED FILM CAPACITOR AND MANUFACTURING PROCESS

[75] Inventor: Rick A. Price, Forest, Va.

[73] Assignee: Illinois Tool Works, Inc., Glenview, Ill.

[21] Appl. No.: 08/749,743

[22] Filed: Nov. 15, 1996

[51] Int. Cl.⁶ .................................................. H01G 4/012
[52] U.S. Cl. ........................ 361/304; 361/306.3; 361/309
[58] Field of Search ........................ 361/301.4, 303–305, 361/306.1–306.3, 308.1–308.2, 309–310, 301.1, 301.3, 313

[56] References Cited

U.S. PATENT DOCUMENTS

| | | | |
|---|---|---|---|
| 4,297,773 | 11/1981 | Galvagni | 29/25.42 |
| 4,463,407 | 7/1984 | Berger et al. | 361/306 |
| 4,531,268 | 7/1985 | Rayburn | 29/25.42 |
| 4,580,190 | 4/1986 | Rayburn | 361/310 |
| 4,613,516 | 9/1986 | Ham et al. | 29/25.42 |
| 4,741,077 | 5/1988 | Langlois | 29/25.42 |
| 4,959,652 | 9/1990 | Hirama | 361/310 |
| 5,053,916 | 10/1991 | Weekamp et al. | 361/308 |
| 5,055,965 | 10/1991 | Rayburn | 361/303 |
| 5,083,234 | 1/1992 | Lehto et al. | 361/283 |
| 5,128,827 | 7/1992 | Yokotani et al. | 361/309 |
| 5,144,523 | 9/1992 | Pageaud et al. | 29/25.42 |
| 5,258,153 | 11/1993 | Chapas et al. | 264/104 |

Primary Examiner—Kristine Kincaid
Assistant Examiner—Anthony Dinkins
Attorney, Agent, or Firm—Rockey, Milnamow & Katz, Ltd.

[57] ABSTRACT

A capacitor is made from a laminated structure having multiple layers of metallized dielectric film and having a solderable metal termination at each of two ends. The metal termination at each of the ends is generally rectangular with a top edge, a bottom edge, and two side edges and is finished so as to have a finished surface, which is characterized by a three-dimensional pattern of ridges having solderable surfaces and grooves having solderable surfaces. The ridges alternate with the grooves and the ridges and the grooves at both of the ends are parallel to the side edges. Thus, the three-dimensional pattern facilitates reflow soldering to the finished surface.

15 Claims, 1 Drawing Sheet

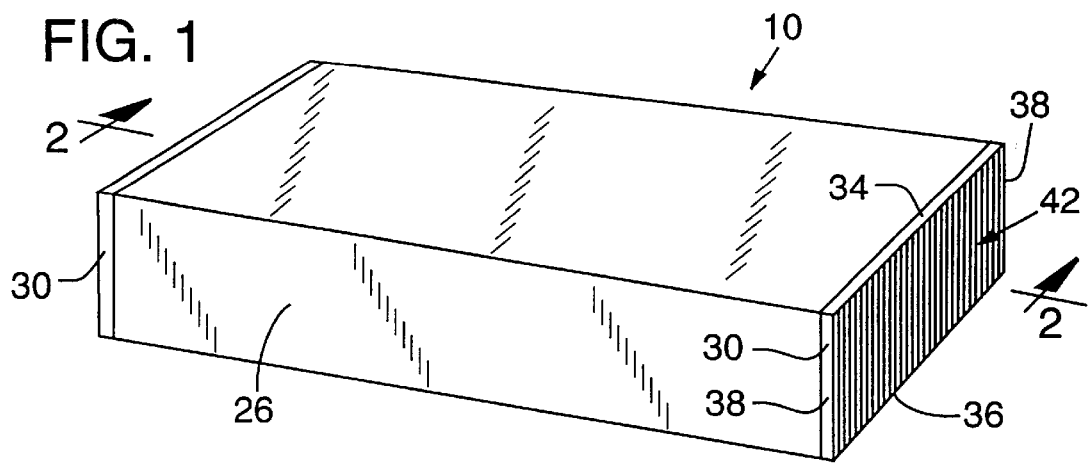
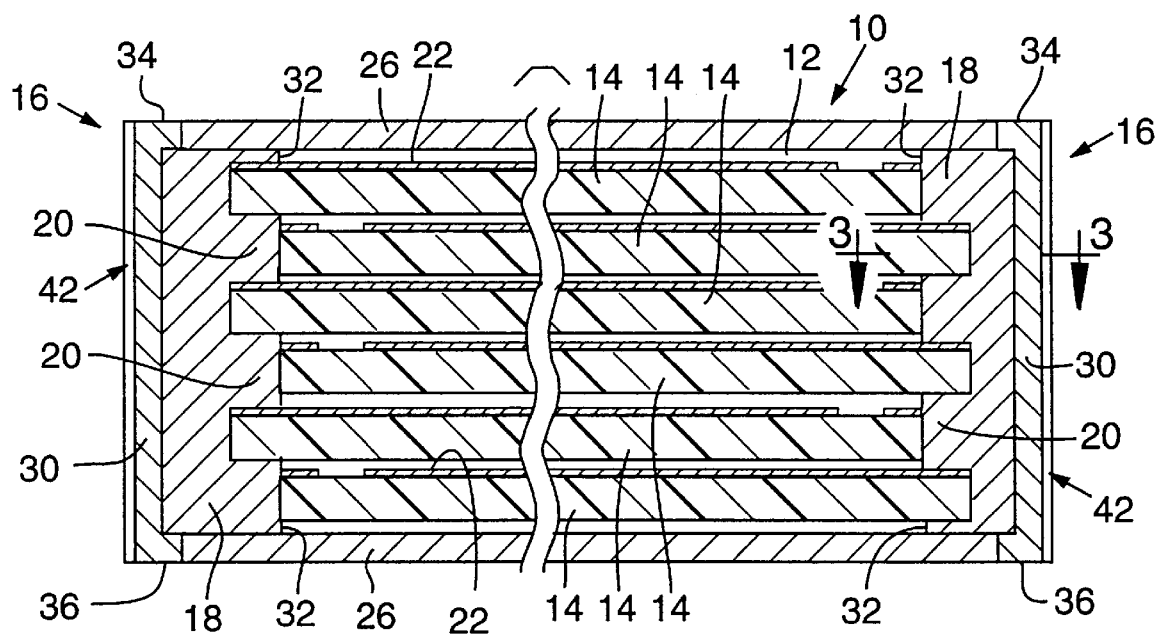
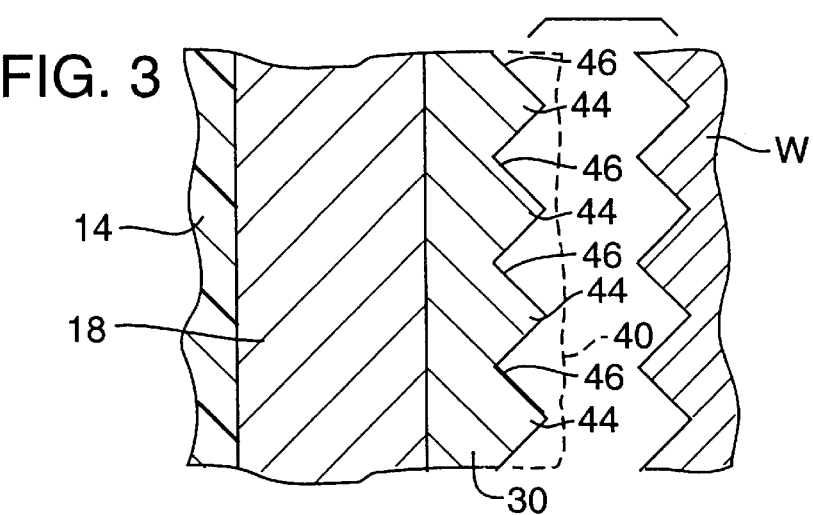

METALLIZED FILM CAPACITOR AND MANUFACTURING PROCESS

TECHNICAL FIELD OF THE INVENTION

This invention pertains to an improved capacitor made from a laminated structure having multiple layers of metallized, dielectric film and having a solderable, metal termination at each of two ends. This invention also pertains to a process for manufacturing the improved capacitor. Each of the metal terminations has an exposed surface, which is characterized by a three-dimensional pattern facilitating reflow soldering.

BACKGROUND OF THE INVENTION

Commonly, reflow soldering is employed for surface-mounting a metallized film capacitor having two metal terminations to a circuit board. In reflow soldering, a paste solder is applied to the metal terminations of the metallized film capacitor, which is positioned suitably on the circuit board. When the circuit board, the capacitor, and the solder paste are heated, the solder paste fuses and forms a liquid solder, which then is cooled, hardens, and connects the metal terminations mechanically and electrically to the circuit board.

As exemplified in Rayburn U.S. Pat. No. 4,580,190 and in Rayburn U.S. Pat. No. 4,531,268, it is known to make a metallized film capacitor from a laminated structure having multiple layers of metallized, dielectric film and having a sprayed, metal termination at each of two ends. When reflow soldering is employed, it is necessary to employ a solderable metal at the exposed surfaces of the metal terminations.

In Langlois U.S. Pat. No. 4,741,077, which discloses a process of related interest for manufacturing metallized film capacitors, burnishing is employed to render deposited metal films more solderable. In Hirama U.S. Pat. No. 4,959,652, which also discloses a process of related interest for manufacturing metallized film capacitors, sandpaper or emery paper is employed for removing a coating resin so as to expose an electrode surface and for roughening the exposed surface before soldering. The Hirama patent also discloses that grooves are formed in the exposed surface, through the coating resin, to improve soldering.

Typically, when metallized film capacitors are burnished, burnishing is practiced in a rotary or tumbling chamber containing abrasive burnishing media. By thus practiced, burnishing tends to round the capacitor ends, particularly near their top and bottom edges. The rounded ends tend to impair reflow soldering. Burnishing with abrasive burnishing media does little to reduce surface porosity, which is detrimental because moisture readily penetrates the porous surfaces. Furthermore, when metallized film capacitors are burnished with abrasive burnishing media, it can be quite difficult to maintain tight dimensional tolerances. Additionally when burnishing thus is practiced, there is some risk of physical damage to metallized film capacitors being burnished.

SUMMARY OF THE INVENTION

This invention provides an improved capacitor made from a laminated structure having multiple layers of metallized, dielectric film. The laminated structure has a solderable, metal termination at each of two ends. According to this invention, the metal termination at each of the ends has an exposed, solderable surface, which is characterized by a three-dimensional pattern of ridges having solderable surfaces and grooves having solderable surfaces with the ridges alternating with the grooves. Thus, the three-dimensional pattern facilitates reflow soldering to the exposed, solderable surface of the metal termination.

Preferably, the ridges and the grooves are straight. More preferably, the ridges and the grooves are unidirectional. Most preferably, if the metal termination at each of the ends is generally rectangular with a top edge, a bottom edge, and two side edges, the ridges and the grooves at both of the ends are parallel to the side edges.

This invention also provides a process for manufacturing the improved capacitor wherein the metal terminations are finished so that the metal termination at each of the ends has an exposed surface, which is characterized by a three-dimensional pattern of ridges having solderable surfaces and grooves having solderable surfaces with the ridges alternating with the grooves, as discussed above.

These and other objects, features, and advantages of this invention are evident from the following description of a preferred embodiment of the improved capacitor provided by this invention and of a preferred mode for carrying out the process provided by this invention.

BRIEF DESCRIPTION OF THE DRAWINGS

FIG. 1 is a perspective view of an improved capacitor constituting a preferred embodiment of this invention.

FIG. 2, on a larger scale compared to FIG. 1, is a fragmentary, sectional view taken along line 2—2 of FIG. 1, in a direction indicated by arrows.

FIG. 3, on a larger scale compared to FIG. 2, is a fragmentary, sectional view taken along line 3—3 of FIG. 2, in a direction indicated by arrows.

DETAILED DESCRIPTION OF ILLUSTRATED EMBODIMENT AND MANUFACTURING PROCESS

As shown in the drawings, a capacitor 10 made from a laminated structure 12 having multiple layers 14 of metallized, dielectric film constitutes a preferred embodiment of the improved capacitor provided by this invention. The capacitor 10 is made by a preferred mode for carrying out the process provided by this invention. Except as illustrated in the drawings and described herein, the capacitor 10 is similar to one of the capacitive structures disclosed in Rayburn U.S. Pat. No. 4,531,268, the disclosure of which is incorporated herein by reference. Except as illustrated in the drawings and described herein, the capacitor 10 is manufactured by a process similar to the process disclosed in Rayburn U.S. Pat. No. 4,531,268 for manufacturing the disclosed structures.

At each of two ends 16, an inner, metal termination 18 comprised of a conductive metal, such as aluminum, is applied by spraying so as to fill indentations 20 in the laminated structure 12, and so as to make electrical contact with metallized surfaces 22 of the film layers 14. Next, the laminated structure 12 and inner portions of the inner, metal terminations 18 at the ends 16 are wrapped with a radiant shield 26, between the ends 16, so as to allow outer portions of the inner, metal terminations 18 to remain unwrapped.

The laminated structure 12 and inner portions 24 are wrapped with the radiant shield 26 in a manner disclosed in U.S. patent application Ser. No. 08/493,504, which was filed on Jun. 21, 1995, which is owned commonly herewith, and the disclosure of which is incorporated herein by reference. The radiant shield 26 may be a metal tape, as shown, or may be any of the other shields disclosed in U.S. patent application Ser. No. 08/493,504.

At each of the ends 16, an outer, metal termination 30 comprised of a conductive, solderable metal, such as antimony, zinc, or a lead-free, tin-based alloy, is applied by spraying so as to cover the inner, metal termination 18 at such end 16 and a near edge 32 of the radiant shield 26. Preferably, a tin-based alloy is used, which has at least an 85 percent tin content. A most preferred, tin-based alloy is comprised of 89 percent by weight of tin and 7 percent by weight of antimony.

At each of the ends 16, the outer, metal termination 30 is generally rectangular when viewed endwise with a top edge 34, a bottom edge 36, and two side edges 38. Moreover, as sprayed, the outer, metal termination 30 at each of the ends 16 has a porous surface 40 and exhibits high concentrations of non-solderable oxides on the porous surface 40. Therefore, it is necessary to finish the porous surface 40 by removing some of the surface metal so as to remove non-solderable oxides, and so as to reduce the porosity of the surface metal.

As an improvement over roughening the surface metal with sandpaper or emery paper, as discussed above, and over burnishing the surface metal, as discussed above, the porous surface 40 of the outer, metal termination 30 at each of the ends 16 is finished by removing some of the surface metal via a suitable tool, such as the finishing wheel W shown in the drawings, or via suitable finishing materials. Thus, non-solderable oxides are removed, and the porosity of the surface metal is reduced significantly by a "smearing" action.

Also, as a novel result attributable to the process provided by this invention, the outer, metal termination 30 at each of the ends 16 has an exposed surface 42, which is bright, shiny, and characterized by a three-dimensional pattern of ridges 44 having solderable surfaces and grooves 46 having solderable surfaces. The ridges 44 alternate with the grooves 46. Preferably, as shown, the ridges 44 and the grooves 46 are straight, unidirectional, and parallel to the side edges 38, at both of the ends 16. As shown, the grooves 46 where deepest are beyond of the ends 16 of the laminated structure 12 and of the inner, metal terminations 18. Thus, at each of the ends 16, the three-dimensional pattern facilitates reflow soldering to the exposed surface 42 of the outer, metal termination 30.

As compared to the surface area that the exposed surface 42 would have if the exposed surface 42 were flat, the surface area of the exposed surface 42 is increased significantly because of the three-dimensional pattern. Thus, when reflow soldering is employed, the surface tension of the liquid solder is increased substantially. The three-dimensional pattern facilitates wetting of the bright, shiny, exposed surface 42 by the liquid solder.

Table I below sets forth how the surface area is increased over the standard area, in terms of the actual area and the percentage of increase of the actual area over the standard area, for an exposed surface like the exposed surface 42 with a length of approximately 0.125 inch, a width (top to bottom) of approximately 0.235 inch, and a standard area of approximately 0.02938 square inches (0.125×0.235= 0.02938) and with varying numbers of grooves of a uniform depth of approximately 0.0005 inch.

TABLE I

| Groove Depth (d) | 0.0005 | 0.0005 | 0.0005 | 0.0005 | 0.0005 | 0.0005 |
|---|---|---|---|---|---|---|
| Grooves | 50 | 100 | 200 | 300 | 400 | 500 |
| Groove Width (p) | 0.00470 | 0.00235 | 0.00118 | 0.00078 | 0.00059 | 0.00047 |
| Area | 0.03003 | 0.03192 | 0.03857 | 0.04764 | 0.05799 | 0.06906 |
| Increase over Area (Std) | 2.2% | 8.7% | 31.3% | 62.2% | 97.4% | 135.1% |

Table II below sets forth how the surface area is increased over the standard area, in terms of the percentage of increase of the actual area over the standard area, for an exposed surface 42 with a length of approximately 0.125 inch, a width (top to bottom) of approximately 0.235 inch, and a standard area of approximately 0.02938 square inches (0.125×0.235=0.02938) and with varying numbers of grooves of varying depths.

TABLE II

| | Groove Depth | | | | | |
|---|---|---|---|---|---|---|
| # of Grooves | 0.00020 | 0.00040 | 0.00050 | 0.00060 | 0.00080 | 0.00100 |
| 50 | 0.4% | 1.4% | 2.2% | 3.2% | 5.6% | 8.7% |
| 100 | 1.4% | 5.6% | 8.7% | 12.3% | 21.1% | 31.3% |
| 150 | 3.2% | 12.3% | 18.6% | 26.0% | 42.9% | 62.2% |
| 200 | 5.6% | 21.0% | 31.3% | 42.9% | 68.9% | 97.4% |
| 250 | 8.7% | 31.3% | 46.0% | 62.2% | 97.4% | 135.1% |
| 300 | 12.3% | 42.9% | 62.2% | 82.9% | 127.4% | 174.2% |
| 350 | 16.4% | 55.6% | 79.4% | 104.8% | 158.4% | 214.2% |
| 400 | 21.0% | 68.9% | 97.4% | 127.4% | 190.1% | 254.8% |
| 450 | 26.0% | 82.9% | 116.0% | 150.6% | 222.3% | 295.8% |
| 500 | 31.3% | 97.4% | 135.1% | 174.2% | 254.8% | 337.1% |

Accordingly, when metallized film capacitors are machined by the process provided by this invention, the capacitor ends are not rounded and do not impair reflow soldering. Moreover, surface porosity is reduced significantly, whereby moisture does not readily penetrate the machined surfaces. Furthermore, at the machined ends, tight dimensional tolerances can be readily maintained. Additionally, as compared to burnishing with abrasive burnishing media, there is less risk of physical damage to metallized film capacitors being machined.

Various modifications may be made in the improved capacitor described above and in the process described above for manufacturing it without departing from the scope and spirit of this invention.

I claim:

1. A capacitor made from a laminated structure having multiple layers of metallized dielectric film, the laminated structure having two ends and having a solderable metal termination at each of the ends, wherein the metal termination at each of the ends has a finished surface which is characterize by a three-dimensional pattern of ridges having solderable surfaces and grooves having solderable surfaces with the ridges alternating with the grooves, and wherein the grooves where deepest are beyond of the ends of the laminated structure, the three-dimensional patterns of ridges and groves facilitating reflow soldering to the finished surfaces of the metal terminations.

2. The capacitor of claim 1 wherein the ridges and the grooves at each of the ends are straight.

3. The capacitor of claim 1 wherein the ridges and the grooves at least one of said ends are unidirectional.

4. The capacitor of claim 3 wherein the ridges and the grooves at both of the ends are unidirectional.

5. The capacitor of claim 3 wherein the metal termination at each of the ends is generally rectangular with a top edge, a bottom edge, and two side edges and wherein the ridges and the grooves at both of the ends are parallel to the side edges.

6. A capacitor made from a laminated structure having multiple layers of metallized dielectric film, the laminated structure having two ends and having a solderable metal termination at each of the ends, wherein the metal termination at each of the ends has a finished surface which defines an outermost surface of the capacitor when used and which is characterized by a three-dimensional pattern of ridges having solderable surfaces and grooves having solderable surfaces with the ridges alternating with the grooves, the three-dimensional patterns of ridges and grooves facilitating reflow soldering to the finished surfaces of the metal terminations.

7. The capacitor of claim 6 wherein the ridges and the grooves at each of the ends are straight.

8. The capacitor of claim 6 wherein the ridges and the grooves at least one of said ends are unidirectional.

9. The capacitor of claim 8 wherein the ridges and the grooves at both of the ends are unidirectional.

10. The capacitor of claim 8 wherein the metal termination at each of the ends is generally rectangular with a top edge, a bottom edge, and two side edges and wherein the ridges and the grooves at both of the ends are parallel to the side edges.

11. A capacitor made from a laminated structure having multiple layers of metallized dielectric film, the laminated structure having two ends and having an inner metal termination and an outer solderable metal termination at each of the ends, wherein the outer solderable metal termination at each of the ends has a finished surface which is characterized by a three-dimensional pattern of ridges having solderable surfaces and grooves having solderable surfaces with the ridges alternating with the grooves, the three-dimensional patterns of ridges and grooves facilitating reflow soldering to the finished surfaces of the metal terminations.

12. The capacitor of claim 11 wherein the ridges and the grooves at each of the ends are straight.

13. The capacitor of claim 12 wherein the ridges and the grooves at least one of said ends are unidirectional.

14. The capacitor of claim 13 wherein the ridges and the grooves at both of the ends are unidirectional.

15. The capacitor of claim 13 wherein the metal termination at each of the ends is generally rectangular with a top edge, a bottom edge, and two side edges and wherein the ridges and the grooves at both of the ends are parallel to the side edges.

* * * * *